United States Patent [19]

Vanaschen et al.

[11] Patent Number: 4,918,946
[45] Date of Patent: Apr. 24, 1990

[54] PROCESS AND DEVICE FOR BENDING GLASS SHEETS

[75] Inventors: Luc Vanaschen, Eupen, Belgium; Hans W. Kuster, Aachen, Fed. Rep. of Germany; Herbert Radermacher, Raeren, Belgium

[73] Assignee: Saint-Gobain Vitrage, c/o Saint-Gobain Recherche, Aubervilliers, France

[21] Appl. No.: 375,480

[22] Filed: Jul. 5, 1989

[30] Foreign Application Priority Data

Jul. 5, 1988 [DE] Fed. Rep. of Germany ....... 3822639

[51] Int. Cl.$^5$ ............................................. C03B 23/03
[52] U.S. Cl. ......................................... 65/104; 65/106; 65/273; 65/287; 65/289
[58] Field of Search ................. 65/104, 106, 273, 287, 65/289

[56] References Cited

U.S. PATENT DOCUMENTS

| | | | |
|---|---|---|---|
| 3,389,984 | 6/1968 | Englehart et al. | 65/106 X |
| 3,459,521 | 8/1969 | Nedelec | 65/106 X |
| 4,318,728 | 3/1982 | Claassen | 65/106 |
| 4,666,490 | 5/1987 | Fecik et al. | 65/106 X |
| 4,666,492 | 5/1987 | Thimons et al. | 65/106 X |

*Primary Examiner*—Arthur Kellogg
*Attorney, Agent, or Firm*—Oblon, Spivak, McClelland, Maier & Neustadt

[57] ABSTRACT

A glass sheets is loaded flat on the end of a conveyor going through a tunnel furnace; comes out again through the other end of the conveyor after having reached its bending temperature; is conveyed by a first transfer device to a bending unit which includes at least one upper bending form; is vacuum-gripped by the upper bending form; is raised along with the upper bending form; is bent to the desired shape by the bending unit; and then is directed by a second transfer device to a cooling station for heat tempering. The transfer from the furnace to the bending unit is obtained by reversible movement, parallel to the general direction of movement of the glass sheet, from the front end of a flexible conveyor belt the rear end of which is under the transport plane of the glass sheet. The initial position of the front end of the flexible sheet is located between the downstream end of the conveyor and the bending unit.

15 Claims, 2 Drawing Sheets

PROCESS AND DEVICE FOR BENDING GLASS SHEETS

FIELD OF THE INVENTION

The invention relates to a process and a device for bending glass sheets. More precisely, the invention relates to bending glass sheets by means of bending forms placed above the horizontal transport plane of the glass sheets. It applies particularly to the production of bent and optionally tempered automobile glazings.

BACKGROUND OF THE INVENTION

Among the various known processes of forming glass sheets, the processes of bending by pressing exhibit the advantage of being especially effective, since they make possible the embodiment of the most difficult glazing shapes. However, they are more difficult to use in a horizontal installation i.e., in an installation in which the glass sheets are heated in a tunnel furnace that they go through conveyed flat on a bed of driving rollers. This is because the device used to transport the glass sheets between the two presses interferes during the passage and/or induces deformations leading to optical defects.

From French Patent No. 1,398,897, a bending process is known according to which the glass sheets are heated flat in a furnace that they go through on a roller conveyor which ends at the outlet of the furnace and is lengthened by an air-cushion conveyor used to place the glass sheets between the two presses of the bending unit. The air-cushion conveyor is backed by a flexible hammock. Once the glass is correctly positioned, the air-cushion conveyor is contracted so that the glass sheet then rests on the hammock, and pressing is subsequently initiated while the hammock remains in place. The drawback of this device is that the hammock is strongly stressed mechanically and must at each bending cycle first be taut and then perfectly adapt itself to the pressing form. The life of such a hammock is consequently very brief. Moreover, the hammock always possesses a certain stiffness which prohibits the most complex shapes—for example, negative local curves (i.e. the glazing shapes comprising distributed centers of curvature on the two opposite sides of the glazing).

Further, from U.S. Pat. Nos. 3,265,484 and 4,318,728, bending installations are known in which the hammock is used directly in the transfer of glass sheets and is used as a flexible conveyor. However, the adjustment of the tension of the hammock is even more difficult than before.

Finally, from European Patent No. 228,597, a bending installation is known comprising a pressing unit with an upper bending form, solid and convex, equipped with a suction device, and an additional lower bending form. The glass sheets are transferred from the furnace to the bending unit by a device consisting of a horizontally mobile vacuum suction plate. This plate picks up a sheet, takes it to the pressing unit, and leaves again in the direction of the furnace. At the end of the pressing, the glass sheet is maintained by suction against the upper suction shape during the entire period necessary for the separation of the two forms and for the introduction, under the upper form, of an annular frame the circumference of which corresponds to the shape given to the glass sheet. The glass sheet is placed by the upper vacuum suction form on the annular frame, which takes it to a unit that cools the glass sheet and tempers it.

The known installation disclosed in European Patent No. 228,597 uses a hammock as a uniform support for the glass sheets and their positioning relative to the bending tools. The hammock is stretched above the lower bending form and is released during the pressing operation. Accordingly, from this point of view, the process is analogous to that disclosed in French Patent No. 1,398,897. Furthermore, to operate, the vacuum suction plate used for the transfer from the furnace to the pressing unit must be equipped with a vacuum pump which produces the partial vacuum necessary for the suction and with electric connections for the control of the pump motor. All this equipment must be able to withstand very high temperatures, since the vacuum suction plate enters the hottest end of the furnace, which makes it necessary to choose high-cost materials and construction techniques.

OBJECT OF THE INVENTION

The invention has as its object a process for bending glass sheets according to which the transfer of glass sheets from the furnace to the bending unit is achieved in a very simple manner, without recourse to a mobile suction device, does not cause trouble during the press-forming process, and does not cause optical defects due to a nonuniform support of the glass.

SUMMARY OF THE INVENTION

According to the invention, a glass sheet is loaded flat on the end of a conveyor going through a tunnel furnace, comes out again through the other end of the tunnel furnace after having reached its bending temperature, is conveyed by a first transfer device to a bending unit which comprises at least one upper bending form, is vacuum gripped by the upper bending form, is raised along with the upper bending form, is bent to the desired shape by the bending unit, and then is directed by a second transfer device to a cooling station for heat tempering. The transfer from the furnace to the bending unit is obtained by reversible movement, parallel to the general direction of movement of the glass sheet, from the front end of a flexible conveyor belt the rear end of which is under the transport plane of the glass sheet. The initial position of the front end of the flexible sheet is located between the downstream end of the conveyor and the bending unit.

GENERAL DISCUSSION OF THE INVENTION

The process according to the invention makes possible a perfect support of the glass sheet in the last phase of its path to the bending unit—the phase when the glass is hottest and therefore most subject to deformation and which is performed at a relatively slow rate, since it is necessary to assure precisely the stopping position under the upper bending form (this, of course, to guarantee a good conformity of the curve). Moreover, it is easier to limit the slippage of the glass sheets on the flexible belt than on the rollers of the prior art.

The upper bending form preferably is convex.

The process according to the invention allows numerous variants of the forming of glass sheets that can be classified, for example, as a function of the length of the vertical displacement of the upper bending form. The pickup of the glass sheet supported by the flexible belt thus can be performed while the upper bending form is at a low height above the taut flexible belt—provided, of course, that a suction power sufficient to cause the pickup of the glass sheet is used. The flexible nature of the conveyor belt also makes it possible to lower the upper bending form until its central part touches the glass sheet. The impact then is balanced immediately by a slight deformation of the flexible belt which keeps, however, an essentially planar character and thereby does not cause undesired deformations of the glass. In the two cases previously mentioned (which preferably address the production of glazings exhibiting a slight curve), the forming of glass can be obtained essentially by suction, the glass sheet assuming the contours of the upper bending form. The forming also can be completed by a deformation of the glass by inertia and gravity during the pickup of the glass sheet by the second transfer device, advantageously consisting of an annular frame the contours of which correspond to the shape that is desired to be given to the glass sheet and which also can be used as a tempering frame. This pickup can be performed very rapidly thanks to the rapid contraction of the conveyor belt, the return of which to its initial position frees the space located under the upper bending form.

The vertical displacement of the upper bending form can be adjusted also so that all or part of the form sinks into the flexible conveyor belt, which then concomitantly plays the role of a pressing counterform. This is advisable in the production of glazings exhibiting a significant curve—particularly glazings of complex shape.

The pressing against the flexible conveyor belt can be continued until the entire lower face of the glass sheet is put into contact with the upper bending form and in this way directly obtains its definitive shape. After the contraction of the conveyor belt, the glass sheet the bending of which thus is completed is placed on an annular frame of the same shape so as to simply support the glass, without additional forming.

For the most difficult glazing shapes, the pressing against the flexible conveyor belt constitutes only a preforming, and an additional forming is performed by pressing after the flexible belt has freed the space under the upper bending form. The annular frame used to transport the glass sheets to the cooling station can be used as a female counterform or, better, a counterform reserved exclusively for this purpose, placed stationarily or movably under the transport plane of the glass sheets. The annular frame is then brought to recover the glass sheets bent to their definitive shapes to guide them to a cooling station and/or to a tempering station.

The invention also comprises a device for the use of the bending process defined above. This device comprises a horizontal furnace, a bending station comprising at least one vertically mobile upper bending form, a first device for the transfer of glass plates between a conveyor in the furnace and the bending station, a station for cooling (particularly by heat tempering), and a second device for the transfer of bent glass sheets to the cooling device. The first device consists of a section of flexible conveyor belt made of a heat-resistant material, the front edge of the section being able to be moved in a reversible way between a ready position located between the conveyor of the furnace and the bending station and an extreme downstream position located on the other side of the bending station.

The flexible belt section used during the transfer can be unwound— or, on the contrary, rewound—from a roller attached under the transport plane of the glass sheets. Devices are preferably provided to control the rate and tension of the belt.

According to a second embodiment of the invention, which is more especially preferred, the flexible belt section is maintained during the entire transfer process in an essentially planar state by moving its rear edge over the same distance as the front edge. This arrangement promotes less wear of the flexible conveyor belt and particularly makes possible a simpler and more effective control of the rate and tension of the belt for the appropriate adjustment elements.

BRIEF DESCRIPTION OF THE DRAWINGS

Other advantageous details and characteristics of the invention will become evident from the description set forth below in reference to the accompanying drawings.

DETAILED DESCRIPTION OF THE PRESENTLY PREFERRED EMBODIMENTS

Figure 1:
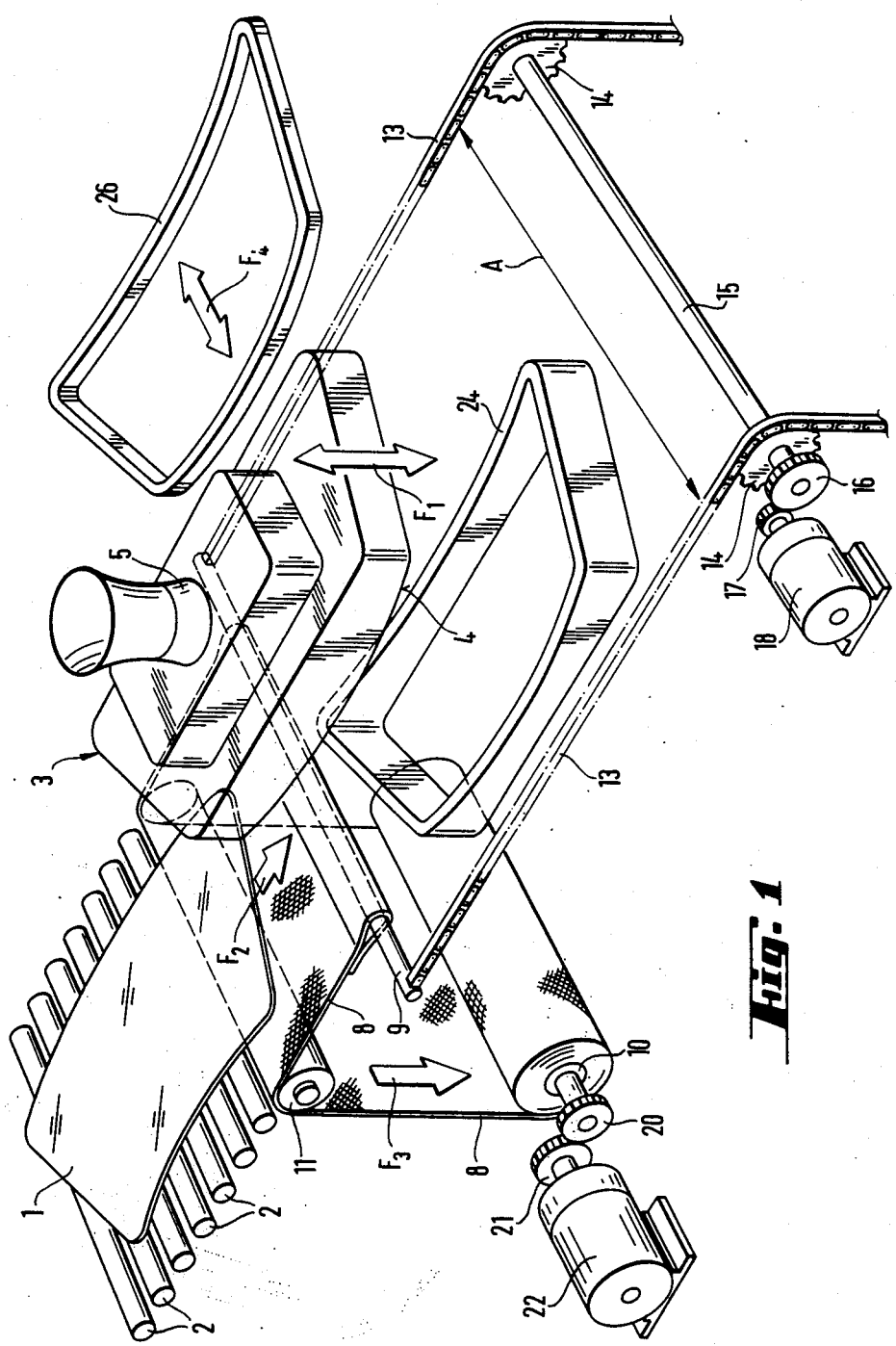
FIG. 1 shows a bending device with a flexible belt wound and unwound on a drum.

In the drawings, only the most significant elements of the bending devices are represented, and those elements are shown more or less diagrammatically. The illustrated elements are mainly the ordinary elements for machines of this kind.

The First Embodiment

With the assistance of a conveyor consisting of a plurality of drive rollers 2, a glass sheet 1 is transported through a tunnel furnace 6 in which the glass sheet 1 is heated to its bending temperature. The tunnel furnace 6 comes out at a bending station 7 in which an upper bending form 3 is placed above the transport plane of the glass sheet 1. As is indicated by a double arrow F1, the upper bending form 3 is mounted so as to be vertically mobile. A bending surface 4 of the upper bending form 3 that comes into contact with the glass sheet 1 is convex. The bending surface 4 is equipped with multiple holes connected with a plenum 12 that can be put under partial vacuum by a vacuum pump 5. In this way, a suction form is achieved on the surface of which the glass sheet 1 can be maintained by suction.

A flexible conveyor belt 8 is used to transfer the hot glass sheets 1 between the drive rollers 2 and the bending station 7 to place the hot glass sheet 1 under the upper bending form 3. The flexible conveyor belt 8 consists of a framework or a fabric made of a heat resistant material such as, for example, glass fibers or heat resistant metal wire. The width of the flexible conveyor belt 8 corresponds to the length of the drive rollers 2. The front edge of the flexible conveyor belt 8 is attached to a rod 9, and the rear edge of the flexible conveyor belt 8 is attached to a cylindrical drum 10 turning around its longitudinal axis and placed under the drive rollers 2. Parallel to last drive roller 2 is placed a return drum 11, placed at a height so that, after it passes the return drum 11, the flexible conveyor belt 8 is located in the extension of the horizontal transport plane defined by the drive rollers 2. The return drum 11 is mounted in free rotation.

A chain 13 is attached to each end of the rod 9 holding the flexible conveyor belt 8. Each chain 13 engages a gear 14 attached to a shaft 15. The shaft 15 is placed behind the bending station 7 seen in the direction of movement of the glass sheet 1. A gear 16 is mounted on the shaft 15 is meshing engagement with a gear 17 that transmits the movement of rotation of an electric motor 18. The distance A between the chains 13 is large enough to allow the upper bending form 3, driven in a vertical movement (as indicated by the double arrow F1), to pass between them.

Likewise, the cylindrical drum 10 is mounted on a shaft 19 on which a gear 20 is mounted, and the gear 20 is in meshing engagement with a gear 21 that is driven in rotation by an electric motor 22. The electric motor 18, the electric motor 22, and their respective controls give to the flexible conveyor belt 8 a preselectable mechanical tension and move the flexible conveyor belt 8 at the appropriate times in the direction of an arrow F2 or, on the contrary, in the direction of an arrow F3. The speed of the flexible conveyor belt 8 during the transfer of the glass sheet 1 (i.e., the movement according to the arrow F2) corresponds to the speed communicated by the drive rollers 2, at least while the glass sheet 1 rests both on the drive rollers 2 and on the flexible conveyor belt 8. However, the movement of the glass sheet 1 can be slower if necessary in the last phase of positioning under the upper bending form 3. The return speed (i.e., the movement indicated by the arrow F3) is appreciably greater that the outward speed.

A female counterform 24 is placed under the upper bending form 3. A solid counterform or, preferably, a counterform of the ring type open in its center can be used. The female counterform 24 preferably is mounted stationarily, but it also can be equipped with a raising-lowering device (not shown). The female counterform 24 is placed under the path of the flexible conveyor belt 8 and the rod 9.

To these essential elements of the device, it is still necessary to add an annular frame 26 placed in the usual way on a carriage (not shown), moving in the direction of a double arrow F4. The annular frame 26 has a size and a shape corresponding to the contours of the bent glass sheet 1. After having been bent, the glass sheet 1 is guided by the annular frame 26 to an adjacent cooling station (not shown), where it is rapidly cooled (or tempered) by air sprayed by blowing chambers (not shown).

Naturally, in place of tempering, the glass sheet 1 also can be cooled more or less slowly in the cooling station.

According to the first embodiment of the invention, the process takes place as follows: as soon as the front edge of the glass sheet 1 approaches the flexible conveyor belt 8 on the return drum 11, the electric motor 18 starts and moves the flexible conveyor belt 8 at the transport speed of the glass sheet 1. In this way, the glass sheet 1 is transferred by the flexible conveyor belt 8 on which it rests to the location of the upper bending form 3, under which it is positioned by known means. After this positioning, the upper bending form 3 is lowered low enough so that, thanks to the bending of the flexible conveyor belt 8, the entire surface of the glass sheet 1 is brought into contact with the bending surface 4.

To obtain the flexibility making possible the necessary bending of the flexible conveyor belt 8, the two motors 18 and 22 can, for example, exert on the shaft 15 and on the cylindrical drum 10 a torque such that the flexible conveyor belt 8 is maintained at a given mechanical tension. According to this manner of proceeding, particularly advantageous for rather slight curves, the female counterform 24 is not necessary.

The vacuum pump 5 is started when the upper bending form 3 is lowered in the direction of the glass sheet 1, so that the glass sheet 1 is maintained against the upper bending form 3 by suction due to the partial vacuum. When the glass sheet 1 is applied at all points on the bending surface 4, the upper bending form 3 is raised. The flexible conveyor belt 8 is then freed and brought into its ready position by the electric motor 22. The annular frame 26 then can be guided under the upper bending form 3, which is lowered to the annular frame 26 to place the bent glass plate 1 on the annular frame 26.

According to another way of proceeding, more particularly recommended for greater and/or more complex curves, the forming is completed by a pressing with the female counterform 24. As before, the glass sheet 1 is picked up by the upper bending form 3 after optionally performing a preforming by a concomitant pressing thanks to the flexible conveyor belt 8. After this pickup, the upper bending form 3 and the glass sheet 1 (which remains attached to it by suction) are raised slightly, and the flexible conveyor belt 8 is brought to the ready position for the next glazing. When the area is free, the upper bending form 3 is lowered on the female counterform 24, and the glass sheet 1 is pressed to its definitive shape. Finally, the glass sheet 1 is placed on the annular frame 26 for cooling and the upper bending form 3 is raised.

The Second Embodiment

Figure 2:
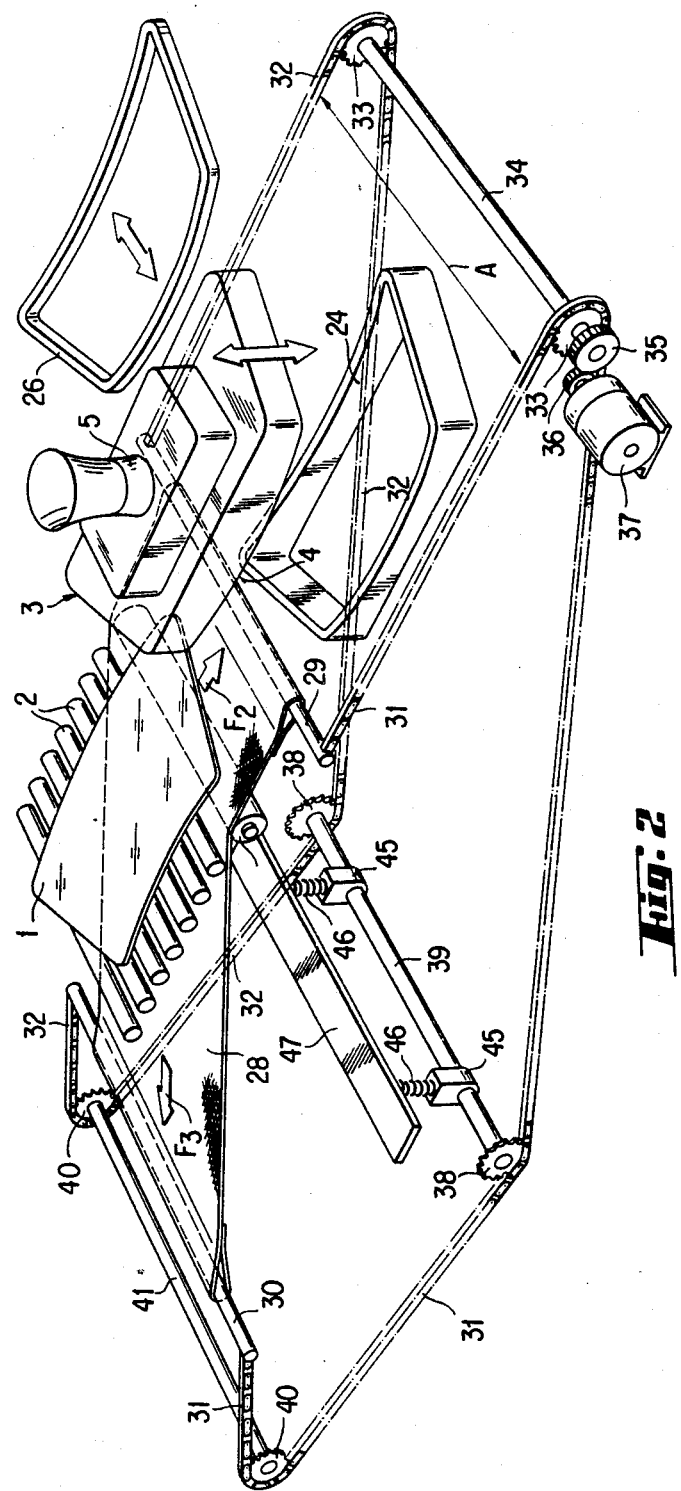
FIG. 2 shows a bending device with a flexible belt maintained during the entire transfer process in an essentially planar state.

The operating procedures explained above also are basically applicable to the device represented in FIG. 2, so the following description is limited to the variant embodiment of the transfer device shown in that figure. That transfer device comprises a conveyor belt 28. The conveyor belt 28 has the shape of a belt section the front edge of which is attached to a rod 29 and the rear edge of which is attached to a rod 30. The conveyor belt 28 is driven by two chains 31, 32 which connect the rods 29 and 30 and maintain the conveyor belt 28 in the taut state. The distance A between the chains 31, 32 is again larger than the width of the bending forms 3, 24, 26.

Behind the bending station 7 seen from the tunnel furnace 6, the chains 31, 32 pass on on a plurality of intermediate gears 33 attached to a common shaft 34. The shaft 34 is put in rotation by a gear 35 mounted on the shaft 34 and a gear 36 that is in mesh with the gear 35 and that is driven by an electric motor 37. The chains 31 and 32 also pass by a plurality of lower intermediate gears 38—likewise attached to a shaft 39—and a plurality of intermediate gears 40 attached to a shaft 41. The shaft 41 and the intermediate gears 40 are placed under the driven rollers 2 and, more precisely, at a location such that the angle that the conveyor belt 28 forms with drive rollers 2 when it reaches a return roller 42 is relatively flat.

The electric motor 37, which obeys an appropriate control, moves the conveyor belt 28 at desired times alternately in the directions given by the arrows F2 and F3.

The flexibility of the conveyor belt 28 necessary for bending during the pickup of the glass sheets 1 by the upper bending form 3 can be obtained by the lower intermediate gears 38—or, more precisely, the shaft 39—being mounted flexibly. For this purpose, a plurality of bearings 45 carrying the shaft 39 are suspended by suitable springs 44 from a stationary stop 43.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A process for bending glass sheets according to which a glass sheet is loaded flat on the end of a conveyor going through a tunnel furnace, comes out again through the other end of the tunnel furnace after having reached its bending temperature, is conveyed by a first transfer device to a bending unit which comprises at least one upper bending form, is picked up by suction by the at least one upper bending form, which then is raised, and is bent to the desired shape by the bending unit, then is directed by a second transfer device to a cooling station, the transfer from the tunnel furnace to the bending unit being obtained by the reversible movement, parallel to the general direction of movement of the glass sheet, from the front end of a flexible conveyor belt the rear end of which is under the transport plane of the glass sheet, the initial position of the front end of the flexible conveyor belt being located between the downstream end of the conveyor and the bending unit.

2. A bending process according to claim 1 wherein the pickup of the glass sheet by the at least one upper bending form is performed concomitantly with a pressing of the glass sheet between the flexible belt and the at least one upper bending form.

3. A bending process according to claim 1 wherein, after the return of the flexible conveyor belt to its ready position, a pressing of the glass plate between the at least one upper bending form and a counterform is performed.

4. A device for bending glass sheets, said device comprising:
   (a) a horizontal furnace through which a roller conveyor passes;
   (b) a bending station placed at the outlet of said horizontal furnace, said bending station comprising at least one vertically mobile upper bending form;
   (c) a first device for the transfer of glass sheets between roller conveyor and said bending station; and
   (d) a second device for the transfer of bent glass sheets to a cooling station, wherein:
   (e) said first device comprises a section of a flexible conveyor belt made of a heat resistant material; and
   (f) the front edge of said section is able to be moved in a reversible way between a ready position located between said conveyor and said bending station and an extreme downstream position located on the other side of said bending station.

5. A device according to claim 4 wherein, under the plane occupied by said conveyor belt, there is provided a counterform able to work with said at least one vertically mobile upper bending form.

6. A device according to claim 4 wherein the front edge of said conveyor belt is attached to a first rod moved by chains placed a distance apart greater than the width of said upper bending form.

7. A device according to claim 6 wherein said conveyor belt passes by a return roller and is stretched by said return roller and a second rod.

8. A device according to claim 7 wherein said first rod and said second rod:
   (a) are maintained under tension by chains passing through intermediate gears and
   (b) can be moved alternately between their extreme positions.

9. A device according to claim 8 wherein said chains are moved by a motor so that the speed of said belt in the outward direction is synchronized with the speed of said roller conveyor and is more rapid in the inward direction.

10. A device according to claim 8 wherein said intermediate gears are suspended by springs.

11. A device according to claim 4 wherein said conveyor belt is wound partially around a drum and passes by a return roller placed in the extension of said roller conveyor.

12. A device according to claim 4 wherein, in going outward, said conveyor belt is driven by a first motor at a speed synchronous with the speed of said roller conveyor and, in returning, said conveyor belt is driven by a second motor at a greater speed.

13. A device according to claim 4 wherein said conveyor belt is mounted flexibly.

14. A device according to claim 4 wherein said conveyor belt comprises a fabric or framework of heat resistant metal wires.

15. A device according to claim 4 wherein said conveyor belt comprises a fabric of glass fibers.

* * * * *